(12) United States Patent
Eustis

(10) Patent No.: US 6,966,250 B2
(45) Date of Patent: Nov. 22, 2005

(54) APPARATUS AND METHOD FOR AGING WINE OR SPIRITS

(75) Inventor: Robert H. Eustis, 862 Lathrop Dr., Stanford, CA (US) 94305

(73) Assignee: Robert H. Eustis, Stanford, CA (US)

(*) Notice: Subject to any disclaimer, the term of this patent is extended or adjusted under 35 U.S.C. 154(b) by 251 days.

(21) Appl. No.: 10/265,016

(22) Filed: Oct. 3, 2002

(65) Prior Publication Data

US 2003/0066429 A1 Apr. 10, 2003

Related U.S. Application Data

(60) Provisional application No. 60/327,683, filed on Oct. 4, 2001.

(51) Int. Cl.[7] .............................. C12F 1/00; C12G 3/07
(52) U.S. Cl. ..................................................... 99/277.1
(58) Field of Search ............................. 99/277.1, 277, 99/277.2, 276, 278, 275; 426/7, 8, 11

(56) References Cited

U.S. PATENT DOCUMENTS

| | | |
|---|---|---|
| 2,017,235 A | 10/1935 | Drew |
| 2,108,661 A | 2/1938 | Farrier et al. |
| 2,114,009 A | 4/1938 | Ramsay |
| 2,203,229 A | 6/1940 | Nilsson et al. |
| 3,942,423 A | 3/1976 | Herzfeld |
| 4,073,955 A | 2/1978 | Koppelman |
| 5,537,913 A | 7/1996 | Vowles |
| 5,647,268 A | 7/1997 | Sullivan |
| 6,378,419 B1 | 4/2002 | Ecklein |

Primary Examiner—Reginald L. Alexander
(74) Attorney, Agent, or Firm—Dorsey & Whitney LLP

(57) ABSTRACT

An apparatus and method for aging wine or spirits is described. The apparatus employs a plurality of spaced hollow semi-permeable tubes which provide an interface wall between the wine or spirits and the atmosphere whereby oxygen can infuse through the walls of the tube into the wine or spirits. In one embodiment, the wine or spirits are in contact with the outer surface of the tubes and the atmosphere with the inner surface. In another embodiment, the wine or spirits are in contact with the inner surface of the tubes and the atmosphere with the outer surface.

9 Claims, 5 Drawing Sheets

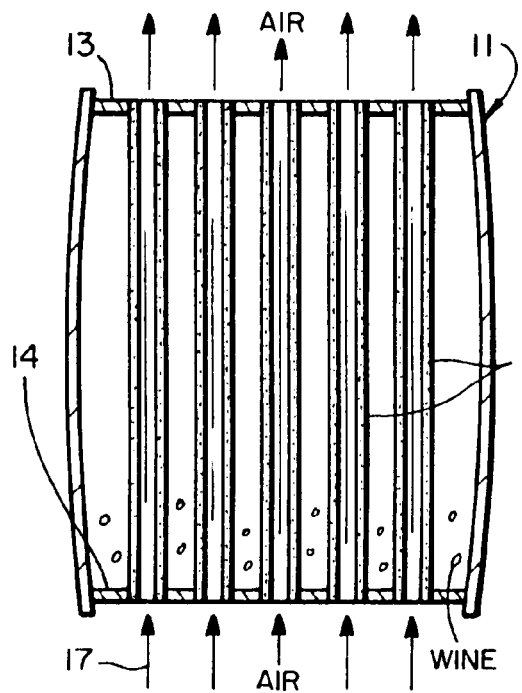
FIG_1
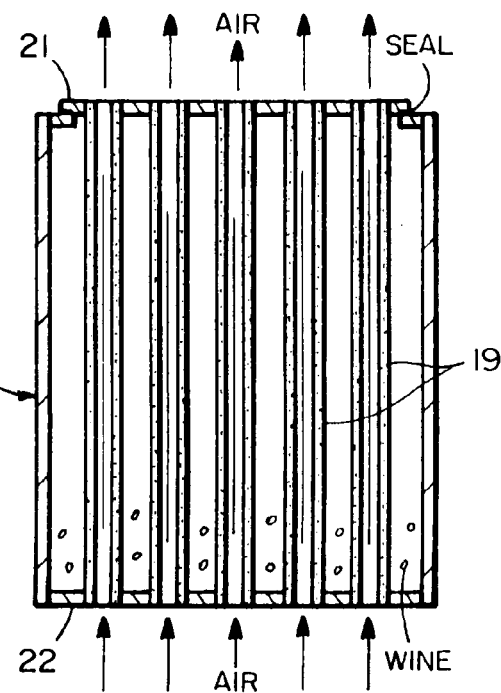
FIG_3
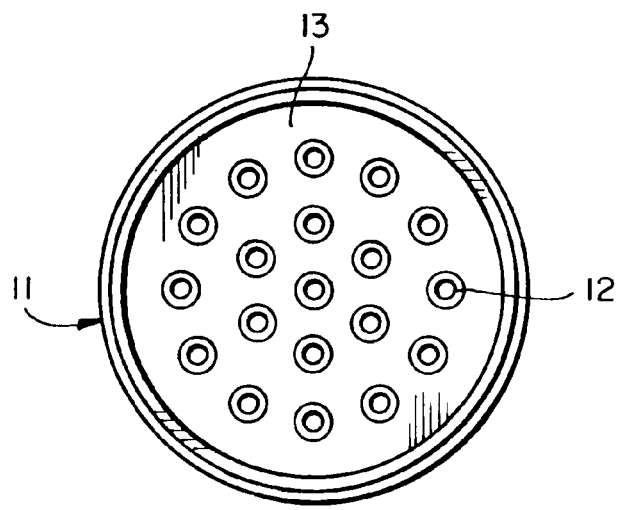
FIG_2

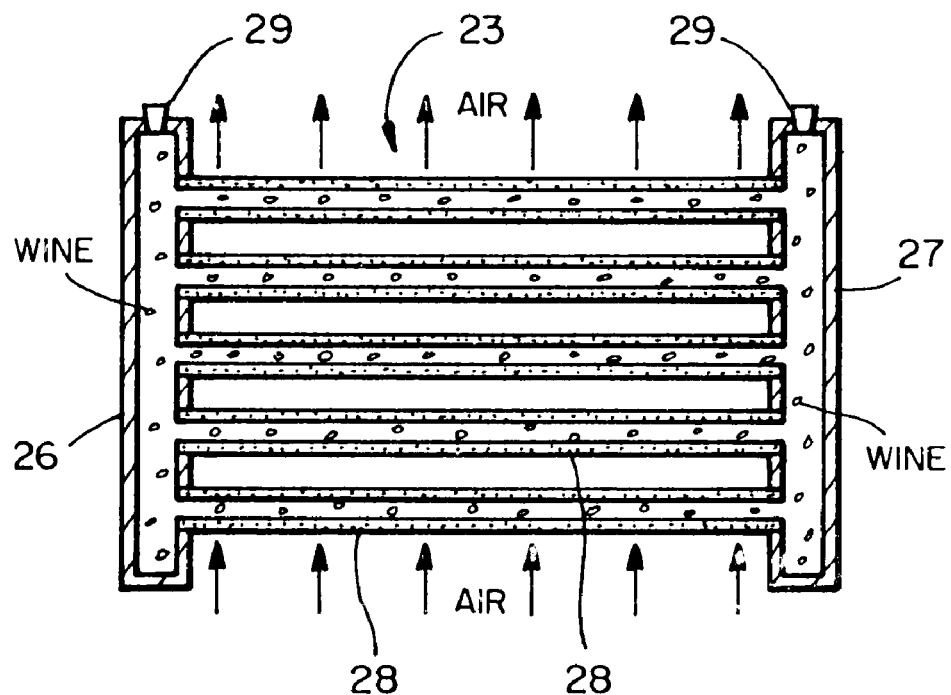
FIG_4
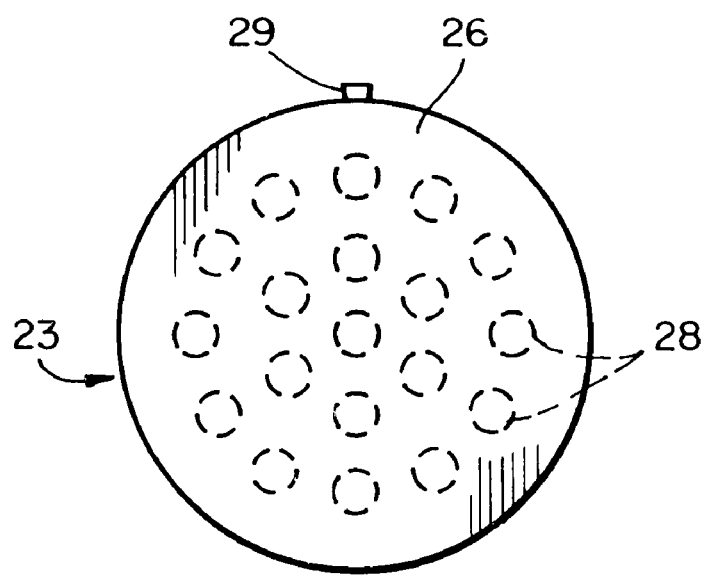
FIG_5

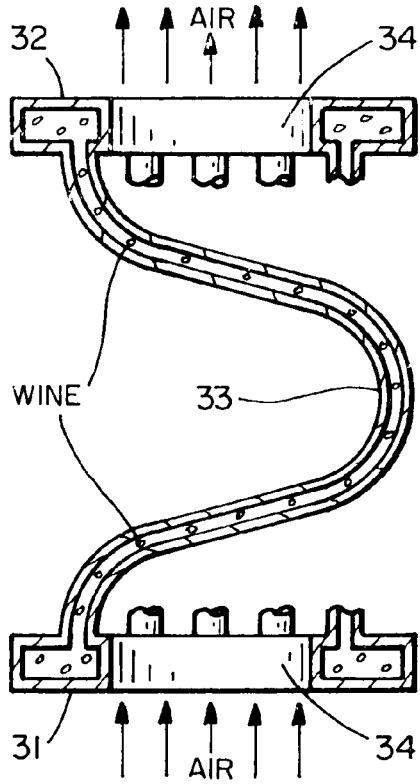
FIG_6
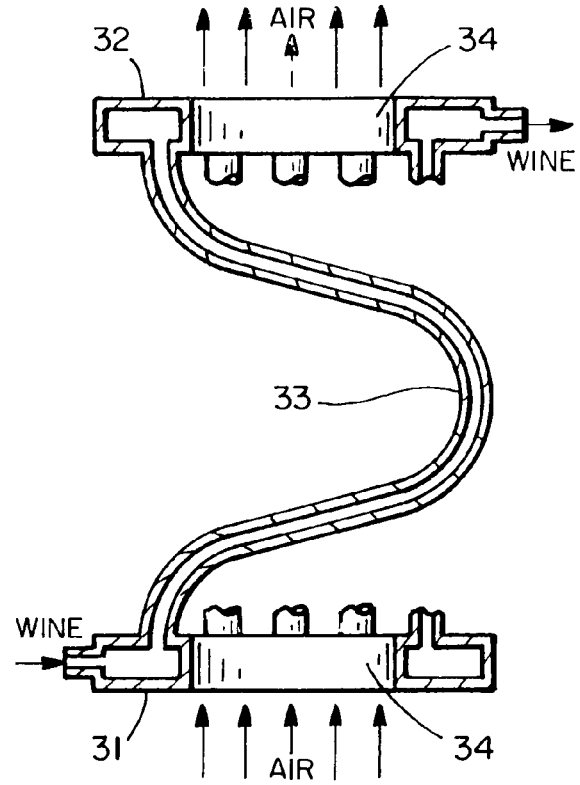
FIG_12
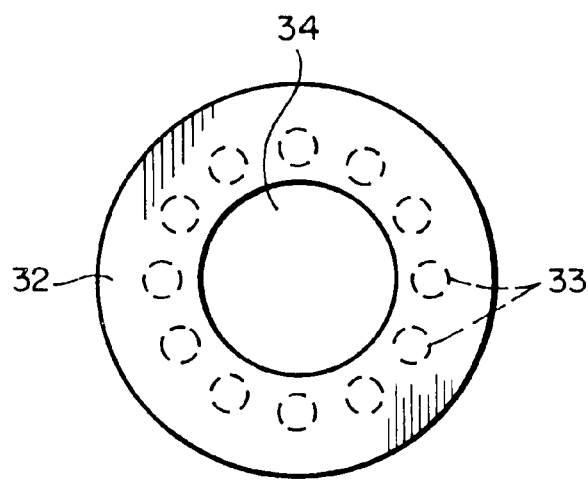
FIG_7

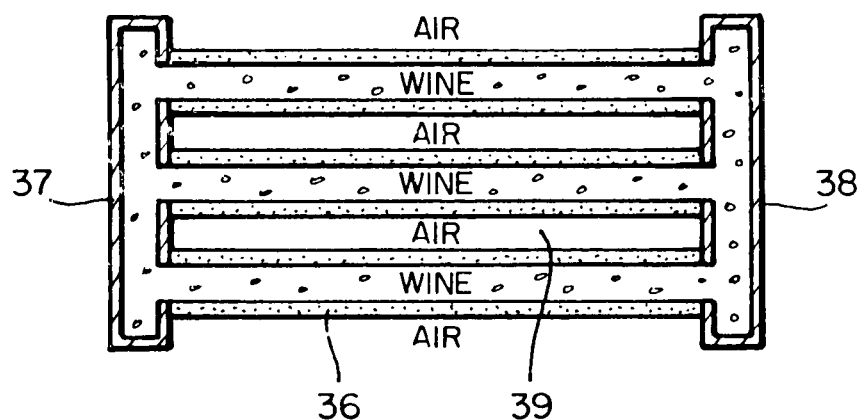
FIG_8
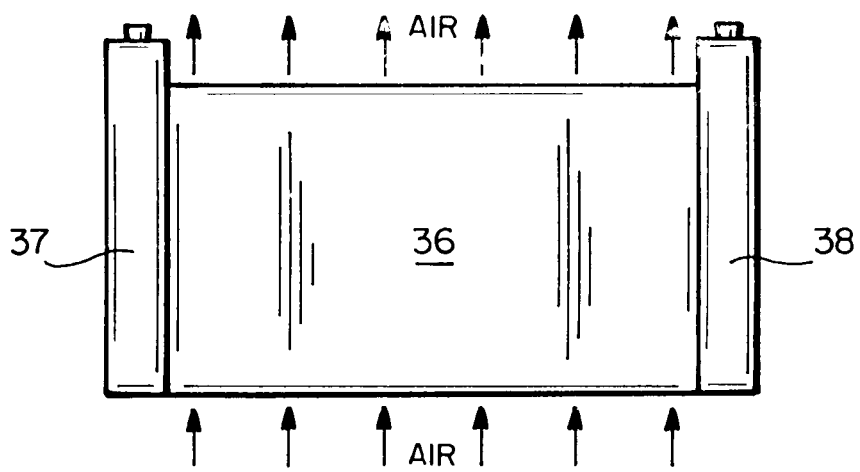
FIG_9
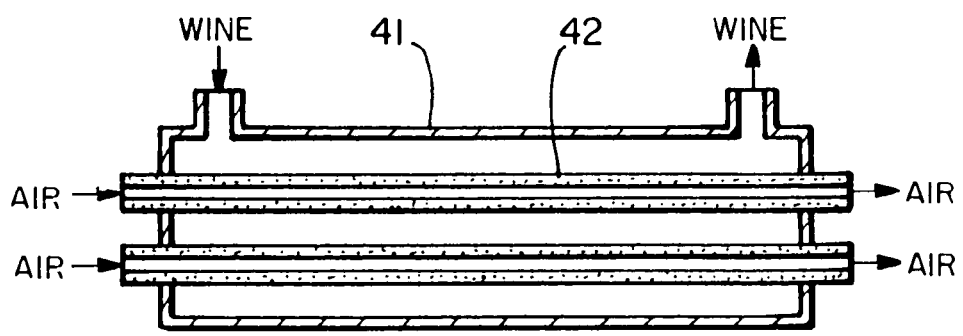
FIG_10

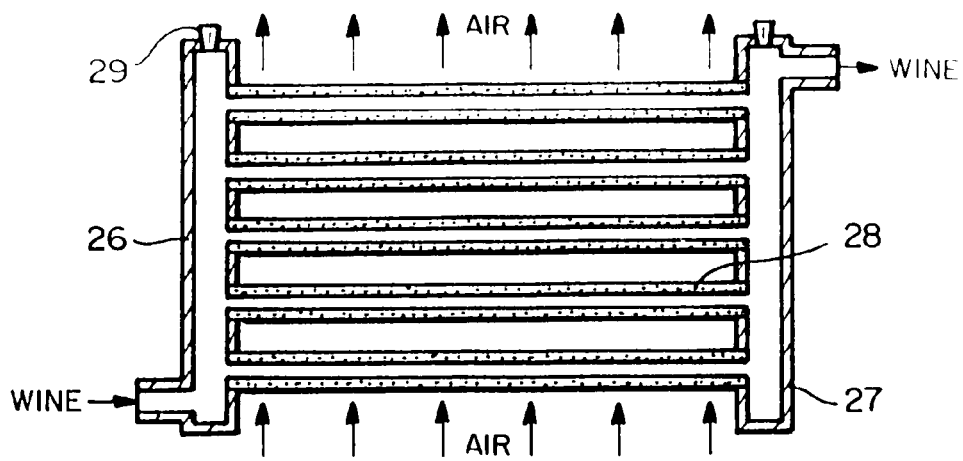
FIG_11
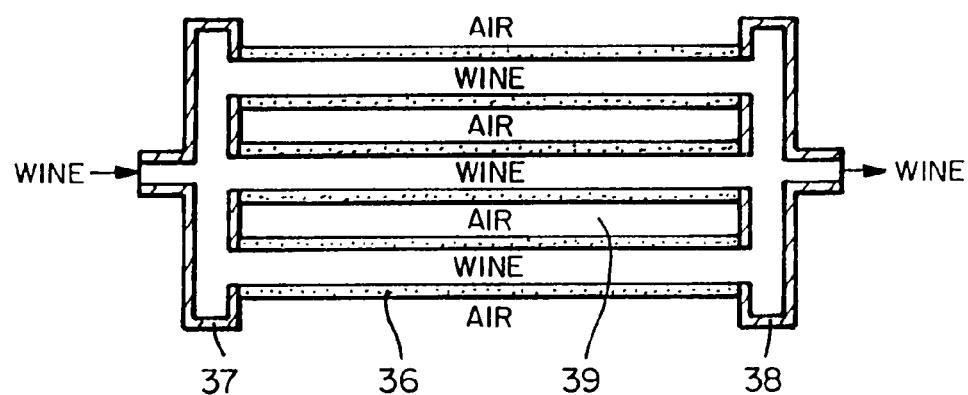
FIG_13
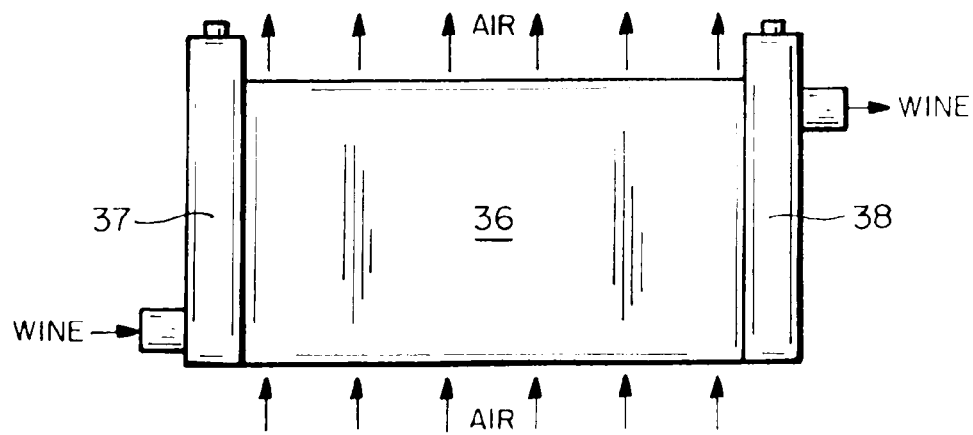
FIG_14

APPARATUS AND METHOD FOR AGING WINE OR SPIRITS

RELATED APPLICATIONS

This application claims priority to Provisional Application Ser. No. 60/327,683 filed Oct. 4, 2001.

BRIEF DESCRIPTION OF THE INVENTION

This present invention relates generally to an apparatus and method for aging wine and spirits, and more particularly to an apparatus in which a semi-permeable wall or membrane provides an interface between the wines or spirits and the atmosphere with the interface with the wine or spirits having a substantially larger interface area with the wine or spirits than that of the prior art.

BACKGROUND OF THE INVENTION

In the making of many wines and spirits it is usual to mature the wine or spirit in wooden barrels. Barrel aging is a centuries-old practice to improve the characteristics such as taste and mellowness of wine. Usually, for quality wines, the barrels are made of oak. It is felt that the infusion of oxygen through the oak into the wine or spirits is an important aging process. Present understanding suggests that the aging process softens the wine by polymerization of the phenols with the involvement of oxygen. Some flavor is introduced by the oak material but it has not been established that the presence of oxygen at the wine-oak interface enhances the quality of the oak-induced flavoring. The oak flavor, for less expensive wines, may be obtained by introducing oak slabs or chips into the wine, which may be contained in stainless steel tanks.

The prior art which may be considered relevant to the present invention involves the modifications of barrels or containers used for the maturation of wines and spirits. The objects of these modifications are directed to decreasing the cost of the container compared to conventional stave barrel or to reduce the use of high-quality oak which is available in limited supply. An example of prior art may be found in the following patents.

U.S. Pat. No. 2,108,661 teaches the use of a single hollow wooden plug with very limited area which provides an interface with the wine in a container. The plug is filled with compounds for treating the wine. It is not used for the purpose of providing an interface to the atmosphere.

U.S. Pat. No. 2,114,009 describes a bored wooden dowel that does not provide a surface for the slow oxidation of wine, but rather is inserted to provide the oak flavor.

U.S. Pat. No. 2,203,229 discloses a plurality of different configurations of a hollow wooden stick which is inserted into a wine bottle to provide communication between the wine and the atmosphere for aging.

U.S. Pat. No. 3,942,423 teaches the use of a single hollow oak rod in a glass container to provide communication between the wine and oxygen in the atmosphere. The surface area of the rod is adjusted to provide the same surface area to wine volume ratio as with a conventional barrel.

U.S. Pat. No. 5,537,913 describes a number of configurations and sealing options to form hollow cylinders which are introduced into a container.

U.S. Pat. No. 6,378,419 replaces the barrel with an aging vessel with an internal slab of oak with cored passages so that compressed air may be circulated through the air passages to provide the wine-atmosphere interface.

Thus, the prior art seeks to provide a porous oak or wood member which communicates between the wine and the atmosphere which has substantially the same interface area to liquid volume ratio as that provided by the standard oak barrels which have been used for centuries to age wine.

The present invention recognizes that conventional barrel-aging of wine or spirits occurs near the interface of wine or spirits (hereinafter "wine") and the interior barrel surface as a result of the infusion of oxygen from the atmosphere and that this interface area is related to the aging process.

OBJECTS AND SUMMARY OF THE INVENTION

It is an object of the present invention to provide an apparatus and method for aging wine in which the ratio of the interface area between the wine and the atmosphere to the volume of the wine is substantially increased with respect to prior art apparatus and methods to thereby shorten the aging period.

It is another object of the present invention to provide an apparatus which has a larger area of semi-permeable (air permeable) wall material separating the volume of wine from air than that of the prior art.

The foregoing and other objects of the invention are achieved by an apparatus for the aging of wine in which the ratio of surface area to oxygen for oxygen infusion to the volume of the wine is at least fifty-percent (50%) greater than that of a standard oak barrel. The method according to the present invention is directed to aging wines in which a given volume of wine is separated from the atmosphere by a semi-permeable wall or membrane which has an interface area that is at least 50% greater than that of the prior art for the same volume as exemplified by a Bordeaux barrel.

BRIEF DESCRIPTION OF THE DRAWINGS

The invention will be more clearly understood and appreciated from the following description when read in conjunction with the accompanying drawings in which:

FIG. 1 is a sectional view of a conventional Bordeaux barrel with semi-permeable tubes in accordance with one embodiment of the present invention.

FIG. 2 is a top view of the barrel shown in FIG. 1.

FIG. 3 shows a sectional view of a food-grade container with semi-permeable tubes in accordance with another embodiment of the present invention.

FIG. 4 is a sectional view of an embodiment of the invention in which the wine is contained in hollow permeable tubes.

FIG. 5 is an end view of the container of FIG. 4.

FIG. 6 shows another embodiment of the invention showing a container employing flexible hollow semi-permeable tubes.

FIG. 7 is an end view of the container of FIG. 6.

FIG. 8 is a sectional view of a container employing spaced plates providing air passages.

FIG. 9 is an elevational view of the container of FIG. 8.

FIG. 10 is a sectional view of a mass transfer reactor including tubes for providing an air-permeable interface to flowing wine.

FIG. 11 is a sectional view of a transfer reactor similar in configuration to the container of FIG. 4 in which the wine flows through the semi-permeable tubes.

FIG. 12 is an embodiment of the container of FIG. 6 in which the wine flows through the semi-permeable tubes.

FIGS. 13 and 14 show an embodiment of the container of FIGS. 8 and 9 in which the wine flows through the apparatus.

DESCRIPTION OF PREFERRED EMBODIMENT

As the aging of wine or spirits (hereinafter "wine") is a process which is related to the area of the interface between the wine and the atmosphere, the rate of aging is expedited by increasing the ratio of participating area of the interface of a semi-permeable wall with the surrounding air to the volume of the wine. This area may be increased well above that of conventional barrels by a number of apparatuses and techniques to be described, and which are related to other surface-dependent processes such as heat or mass transfer. Basically, the wine barrel is considered as a chemical reactor and configurations far removed from the old stave barrel are envisioned by the present invention. These configurations all provide for an air-permeable wall separating the wine from the air. There are a number of designs for increasing the interface area to volume ratio.

Referring to FIG. 1, a conventional staved oak barrel 11 is shown with a plurality of hollow tubes 12 extending between the top and bottom walls 13 and 14 with their ends suitably sealed to the walls. The tubes are made of semi-permeable material such as oak, wood or other semi-permeable material which allows for the infusion of oxygen from the atmosphere through the walls of the material to interact with the wine at the wine-material interface. It should be understood that the oxygen source need not be solely atmospheric, but can be other gas mixtures including oxygen, or oxygen. Although round tubes are illustrated in this embodiment and the other embodiments of the invention, it should be realized that other shapes can be used. Air can travel through the tubes by natural convection as indicated by the arrows 17 or by forcing air through the tubes. For example, if one-inch diameter hollow tubes are inserted on two-inch centers, the interface surface area as compared to the surface area presented by the wooden barrel alone, is increased by a factor of nearly five. Of course, the surface to volume ratio is increased by a larger factor and the diffusion path to reach the wine more distant from the surface is greatly reduced, in this case by a factor of nearly 40.

For example, a 59-gallon Bordeaux barrel has a belly diameter of about 27.5 inches. If air-permeable tubes one inch in outside diameter are spaced two inches on center, the area the of the tubes in contact with the wine is 78 square feet for a barrel length of 34 inches. This compares to an area of 20 square feet for the conventional staved barrel. Although the volume of wine in the barrel is reduced, this is not important because the wine in the central portion of the barrel is only slightly affected during the aging process. A diffusion of oxygen calculation for wine shows that in six months a layer of only two inches is significantly affected. There are a number of materials semi-permeable to gases such as oxygen, but impermeable to liquid such as wine. Commercial materials range from well-known Gore-Tex to sintered ceramics used for oxygen analysis.

When oxygen is introduced into the wine volume as in the permeable tube design, it is possible to replace the wooden barrel with a container of non-porous material such as stainless steel or food grade plastic. This is illustrated by the container 18, FIG. 3, with the semi-permeable tubes 19 secured to and sealed to the end walls 21 and 22. The cost of the container is reduced compared to a staved barrel, and the area for the aging reaction is increased.

If, as in much of the present wine production, oak flavor needs to be introduced, it may be introduced by placing wood pieces or chips into the wine with the air-permeable walls being made of material other than oak.

FIGS. 4 and 5 show a preferred embodiment which is an inverse arrangement to that of FIG. 3. The wine is retained in a vessel or container 23 defined by two end sections 26 and 27 and semi-permeable tubes 28. The wine may be topped for volume decreases due to diffusion of alcohol and water vapor through the semi-permeable walls to the atmosphere by removing the stopper 29 and adding more wine. It is of course apparent that the shape of the end sections may be rectangular rather than round as shown in the figures.

FIGS. 6 and 7 show an arrangement where the headers 31 and 32 are in the form of hollow rings interconnected by air-permeable flexible tubes 33 which together contain the wine. Air can travel through the opening 34 in the headers or can be arranged to flow transverse to the tubes.

FIGS. 8 and 9 show an arrangement in which the wine and the air are separated by air-permeable plates 36. More specifically, the arrangement includes headers 37 and 38 which communicate with each other through the space between the permeable walls 36. The permeable walls are interconnected to form air passages 39 through which air flows. The walls provide the desired interface.

FIG. 10 is a version of a shell-and-tube mass transfer reactor which shows wine traveling through the container 41 and air traveling through one or more air-permeable tubes 42. Wine flows slowly through the reactor to provide the desired aging time.

FIG. 11 illustrates a version of FIGS. 4 and 5 in which the wine is caused to slowly flow through the air-permeable tubes 28 which connect the spaced headers 26 and 27.

FIG. 12 shows a version similar to that of FIGS. 6 and 7 in which the wine is caused to slowly flow through the tubes 33 from header 31 to header 32.

FIGS. 13 and 14 illustrate a cross-flow arrangement in the container of FIGS. 8 and 9 in which the wine is caused to flow slowly through the passages.

Thus, in each embodiment, wine is retained in a container of various configurations. The wine interfaces with permeable walls or tubes which interface with air. This permits the infusion of oxygen through the walls or tubes into the wine for aging. The permeable walls provide a large interface area between the wine and the surrounding air. The ratio of interface area to wine volume is substantially greater than that of conventional oak barrels. In the preferred embodiments of FIGS. 4–9 and 11–14 the wine is contained in tubes which are arranged in a heat exchanger configuration greatly increasing the interface area to wine ratio while providing a simple inexpensive aging apparatus and method. In the embodiments of FIGS. 10–14, the increased surface area provided by the use of closely spaced tubes or plates permits a flow process for the aging of wine which will greatly increase the production of aged wine in shorter periods of time. As used herein, it should be understood that "container" can be of the various configurations shown including those where the wine is retained within the spaced tubes which provide the wine-atmosphere interface.

The foregoing descriptions of specific embodiments of the present invention are presented for the purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A container for wines or spirits comprising semi-permeable or impermeable spaced headers and a plurality of spaced semi-permeable tubes or passages formed by spaced plates extending between said headers, said headers and tubes or passages containing the wine or spirits and said headers and tubes or passages providing an interface with a source of oxygen whereby oxygen can infuse therethrough to interact with the contained wine or spirits.

2. A container as in claim 1 in which the tubes are flexible.

3. A container for wine or spirits as in claim 1 or 2 including means for causing the source of oxygen to flow past the tubes or passages.

4. An apparatus for aging wine comprising: semi-permeable or impermeable headers and a plurality of spaced semi-permeable tubes or passages formed by spaced plates extending between and providing communication between the headers, an inlet port in one of said headers and an outlet port in the other header whereby wine can be introduced into said apparatus to fill the headers and tubes or passages with wine or spirits, wherein the outer surface of said tubes or passages interface with a source of oxygen whereby oxygen infuses through the walls of said tubes to the inner surface where it interacts with and ages the wine.

5. An apparatus as in claim 4 including means for causing the wine to flow slowly through the apparatus to provide a continuous aging process.

6. An apparatus as in claim 4 or 5 including means for causing the source of oxygen to flow past the tubes or passages.

7. A container for wine or spirits comprising semi-permeable walls disposed between the wine or spirits and the surrounding atmosphere whereby oxygen from the atmosphere infuses through the walls to the wine interface to interact with and age the wine characterized in that, the ratio of the interface area to volume of wine is increased more than fifty percent as compared to the prior art ratio of interface area to wine provided by oak barrels, and means are provided to cause the wine to move past the walls.

8. A container as in claim 7 in which the container comprises a vessel and a plurality of hollow semi-permeable tubes extending through said vessel with their interior surfaces communicating with a source of oxygen.

9. A container as in claim 8 in which the container is made of food-grade material.

* * * * *